United States Patent
Kapetanovic et al.

(10) Patent No.: US 10,506,582 B2
(45) Date of Patent: Dec. 10, 2019

(54) RESOURCE ALLOCATION FOR DOWNLINK TRANSMISSION TO AT LEAST TWO WIRELESS COMMUNICATION DEVICES

(71) Applicant: Telefonaktiebolaget LM Ericsson (publ), Stockholm (SE)

(72) Inventors: Dzevdan Kapetanovic, Lund (SE); Naveed Butt, Lund (SE); Rocco Di Taranto, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 481 days.

(21) Appl. No.: 15/033,921

(22) PCT Filed: Apr. 12, 2016

(86) PCT No.: PCT/SE2016/050307
§ 371 (c)(1),
(2) Date: May 3, 2016

(87) PCT Pub. No.: WO2017/180029
PCT Pub. Date: Oct. 19, 2017

(65) Prior Publication Data
US 2018/0092077 A1 Mar. 29, 2018

(51) Int. Cl.
*H04W 72/04* (2009.01)
*H04L 1/00* (2006.01)
(Continued)

(52) U.S. Cl.
CPC ......... *H04W 72/044* (2013.01); *H04L 1/0003* (2013.01); *H04L 1/0026* (2013.01);
(Continued)

(58) Field of Classification Search
None
See application file for complete search history.

(56) References Cited

U.S. PATENT DOCUMENTS

2003/0039317 A1* 2/2003 Taylor ............... H04B 3/542
375/295
2007/0230594 A1 10/2007 Mo et al.
(Continued)

FOREIGN PATENT DOCUMENTS

WO 2008073246 A2 6/2008
WO 2017182050 A1 10/2017

OTHER PUBLICATIONS

Yingying Ji et al., "MCS Selection for Performance Improvement in Downlink TD-LTE System", 2012 Second International Conference on Business Computing and Global Information (Year: 2012).*
(Continued)

*Primary Examiner* — Jeffrey M Rutkowski
*Assistant Examiner* — Ning Li
(74) *Attorney, Agent, or Firm* — Murphy, Bilak & Homiller, PLLC

(57) ABSTRACT

There is provided a method for resource allocation for downlink transmission to at least two wireless communication devices in a wireless communication network. Simultaneous transmission to the wireless communication devices is allowed on one or more channels with at least two supported modulation alphabets of different sizes, each channel being defined by a set, called resource unit, of one or more subcarriers. The method comprises obtaining (S1), for each of the wireless communication devices, channel feedback information for each modulation alphabet the wireless communication device supports and for each resource unit on which the wireless communication device is allowed to receive a transmission. The method also comprises selecting (S2), from a number of possible assignments of the wireless communication devices to different resource units and different modulation alphabets, a resource allocation based on the channel feedback information including an assignment of the wireless communication
(Continued)

devices to at least one resource unit and at least one modulation alphabet among those assignments providing the highest total downlink throughput for the wireless communication devices.

19 Claims, 11 Drawing Sheets

(51) Int. Cl.
    *H04W 72/08*       (2009.01)
    *H04L 5/02*        (2006.01)
    *H04L 5/00*        (2006.01)

(52) U.S. Cl.
    CPC .............. *H04L 5/001* (2013.01); *H04L 5/006* (2013.01); *H04L 5/0037* (2013.01); *H04L 5/023* (2013.01); *H04W 72/082* (2013.01); *H04W 72/085* (2013.01); *H04L 5/0085* (2013.01)

(56) References Cited

U.S. PATENT DOCUMENTS

| | | | | |
|---|---|---|---|---|
| 2009/0161545 | A1* | 6/2009 | Ho | H04L 47/225 370/235 |
| 2009/0262653 | A1* | 10/2009 | Toda | H04L 1/0026 370/252 |
| 2010/0064185 | A1* | 3/2010 | Zheng | H04L 1/06 714/704 |
| 2011/0103307 | A1* | 5/2011 | Kim | H04L 5/0048 370/328 |
| 2016/0242182 | A1* | 8/2016 | Chen | H04B 7/04 |
| 2016/0285775 | A1* | 9/2016 | Damnjanovic | H04L 47/30 |
| 2017/0181167 | A1* | 6/2017 | Kenney | H04L 27/2636 |

OTHER PUBLICATIONS

Aggarwal, Rohit et al., "Optimal Resource Allocation in OFDMA Downlink Systems With Imperfect CSI", 2011 IEEE 12th International Workshop on Signal Processing Advances in Wireless Communications, San Francisco, CA, Jun. 26-29, 2011, 266-270.

Khalil, Ayman et al., "Adaptive Self-Learning Resource Allocation Scheme for Unlicensed Users in High-Rate UWB Systems", Wireless Personal Communications, vol. 56, Issue 3, Apr. 20, 2010, 611-623.

Khalil, Ayman et al., "Interference-aware Prioritized Spectrum Scheduling for MB-OFDM Systems", 21st Annual IEEE International Symposium on Personal, Indoor and Mobile Radio Communications, Istanbul, Sep. 26-30, 2010, 1242-1247.

Porat, Ron et al., "11 ax Evaluation Methodology", IEEE P802.11 Wireless LANs, Doc.: IEEE 802.11-14/0571r3, Jul. 17, 2014, 1-38.

Seong, Kibeom et al., "Optimal Resource Allocation for OFDMA Downlink Systems", 2006 IEEE International Symposium on Information Theory, Seattle, WA, Jul. 9-14, 2006, 1394-1398.

Stacey, Robert, "Specification Framework for TGax", IEEE P802.11 Wireless LANs, Doc.:IEEE 802.11-15/0132r15, Sep. 22, 2015, 1-22.

Ji, Yingying et al., "MCS Selection for Performance Improvement in Downlink TD-L TE System", IEEE 2012 Second International Conference on Business Computing and Global Informatization, Oct. 12, 2012, 687-690.

Noh, Yujin et al., "Link Adaptation for HE WLAN", Newracom, IEEE 802.11-14/1329r2, Nov. 9, 2015, 1-28.

Porat, Ron et al., "11ax Evaluation Methodology", Broadcom, IEEE P802.11, Wireless LANs, Jan. 21, 2016, 1-47.

* cited by examiner

RESOURCE ALLOCATION FOR DOWNLINK TRANSMISSION TO AT LEAST TWO WIRELESS COMMUNICATION DEVICES

TECHNICAL FIELD

The proposed technology generally relates to wireless communications, and more particularly to a method and corresponding arrangement for channel allocation and modulation selection for downlink transmission to at least two wireless communication devices in a wireless communication network, as well as a corresponding network device, and a method and corresponding wireless communication device for generating channel feedback signaling to enable such channel allocation and modulation selection, as well as corresponding computer programs and computer-program products and apparatuses.

BACKGROUND

The underlying technology for wireless communications is rapidly evolving and new communication scenarios and applications are constantly being discussed and developed.

One important aspect of wireless communications involves resource allocation such as channel allocation for efficient downlink transmission. Techniques such as Orthogonal Frequency Division Multiple Access, OFDMA, enables simultaneous downlink transmission to wireless communication devices on different frequency channels. To maximize downlink system throughput, the network should allocate wireless communication devices on channels such that they in total receive as much throughput as possible. This corresponds to a classical resource allocation problem for downlink OFDMA systems.

However, the classical resource allocation for downlink OFDMA is not well adapted to the envisaged developments for advanced downlink communication in the future, especially when the degrees of freedom for the overall resource allocation increases and/or there are stricter requirements on the feedback mechanism used as a basis for the resource allocation.

SUMMARY

It is an object to provide a method for resource allocation for downlink transmission to at least two wireless communication devices in a wireless communication network.

It is also an object to provide a method, performed by a wireless communication device, for generating channel feedback signaling to enable resource allocation for downlink transmission.

Another object is to provide an arrangement configured to perform resource allocation for downlink transmission to at least two wireless communication devices in a wireless communication network.

Yet another object is to provide a network device comprising such an arrangement.

Still another object is to provide a wireless communication device configured to generate channel feedback signaling for enabling resource allocation for downlink transmission.

It is also an object to provide a computer program for performing resource allocation.

Another object is to provide a computer program for generating channel feedback signaling to enable resource allocation.

Yet another object is to provide a corresponding computer-program product.

Still another object is to provide an apparatus for resource allocation for downlink transmission to at least two wireless communication devices in a wireless communication network.

It is also an object to provide an apparatus for generating channel feedback signaling to enable resource allocation.

These and other objects are met by embodiments of the proposed technology.

According to a first aspect, there is provided a method for resource allocation for downlink transmission to at least two wireless communication devices in a wireless communication network. Simultaneous transmission to the wireless communication devices is allowed on one or more channels with at least two supported modulation alphabets of different sizes, each channel being defined by a set, called resource unit, of one or more subcarriers. The method comprises obtaining, for each of the wireless communication devices, channel feedback information for each modulation alphabet the wireless communication device supports and for each resource unit on which the wireless communication device is allowed to receive a transmission. The method also comprises selecting, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

According to a second aspect, there is provided a method, performed by a wireless communication device, for generating channel feedback signaling to enable resource allocation in a wireless communication network for downlink transmission on one or more channels with at least two supported modulation alphabets of different sizes. Each channel being defined by a set, called resource unit, of one or more subcarriers. The method comprises determining channel feedback information for each modulation alphabet the wireless communication device supports and for each resource unit on which the wireless communication device is allowed to receive a transmission. The method also comprises generating channel feedback signaling based on the channel feedback information for transmission to the network side of the wireless communication network.

According to a third aspect, there is provided an arrangement configured to perform resource allocation for downlink transmission to at least two wireless communication devices in a wireless communication network, wherein simultaneous transmission to the wireless communication devices is allowed on one or more channels with at least two supported modulation alphabets of different sizes, each channel being defined by a set, called resource unit, of one or more subcarriers. The arrangement is configured to obtain, for each of the wireless communication devices, channel feedback information for each modulation alphabet the wireless communication device supports and for each resource unit on which the wireless communication device is allowed to receive a transmission. The arrangement is also configured to select, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

According to a fourth aspect, there is provided a network device comprising an arrangement according to the third aspect.

According to a fifth aspect, there is provided a wireless communication device configured to generate channel feedback signaling for enabling resource allocation in a wireless communication network for downlink transmission on one or more channels with at least two supported modulation alphabets of different sizes. Each channel being defined by a set, called resource unit, of one or more subcarriers. The wireless communication device is configured to determine channel feedback information for each modulation alphabet the wireless communication device supports and for each resource unit on which the wireless communication device is allowed to receive a transmission. The wireless communication device is also configured to generate channel feedback signaling based on the channel feedback information for transmission to the network side of the wireless communication network.

According to a sixth aspect, there is provided a computer program for performing, when executed, resource allocation for downlink transmission to at least two wireless communication devices in a wireless communication network, wherein simultaneous transmission to the wireless communication devices is allowed on one or more channels with at least two supported modulation alphabets of different sizes. Each channel being defined by a set, called resource unit, of one or more subcarriers. The computer program comprises instructions, which when executed by at least one processor, cause the at least one processor to:
  obtain, for each of the wireless communication devices, channel feedback information for each modulation alphabet the wireless communication device supports and for each resource unit on which the wireless communication device is allowed to receive a transmission; and
  select, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

According to a seventh aspect, there is provided a computer program for generating, when executed, channel feedback signaling to enable resource allocation in a wireless communication network for downlink transmission on one or more channels with at least two supported modulation alphabets of different sizes. Each channel being defined by a set, called resource unit, of one or more subcarriers. The computer program comprises instructions, which when executed by at least one processor, cause the at least one processor to:
  determine channel feedback information for each modulation alphabet the wireless communication device supports and for each resource unit on which the wireless communication device is allowed to receive a transmission; and
  generate channel feedback signaling based on the channel feedback information for transmission to the network side of the wireless communication network.

According to an eighth aspect, there is provided a computer-program product comprising a computer-readable medium having stored thereon a computer program according to the sixth or seventh aspect.

According to a ninth aspect, there is provided an apparatus for resource allocation for downlink transmission to at least two wireless communication devices in a wireless communication network. Simultaneous transmission to the wireless communication devices is allowed on one or more channels with at least two supported modulation alphabets of different sizes. Each channel being defined by a set, called resource unit, of one or more subcarriers. The apparatus comprises an obtaining module for obtaining, for each of the wireless communication devices, channel feedback information for each modulation alphabet the wireless communication device supports and for each resource unit on which the wireless communication device is allowed to receive a transmission. The apparatus also comprises a selecting module for selecting, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

According to a tenth aspect, there is provided an apparatus for generating channel feedback signaling to enable resource allocation in a wireless communication network for downlink transmission on one or more channels with at least two supported modulation alphabets of different sizes. Each channel being defined by a set, called resource unit, of one or more subcarriers. The apparatus comprises a determining module for determining channel feedback information for each modulation alphabet the wireless communication device supports and for each resource unit on which the wireless communication device is allowed to receive a transmission. The apparatus also comprises a generating module for generating channel feedback signaling based on the channel feedback information for transmission to the network side of the wireless communication network.

The proposed technology enables highly improved resource allocation based on extended channel feedback including, for each wireless communication device, channel feedback information for each modulation alphabet and for each resource unit.

In this way, an optimized resource allocation can be selected, based on the channel feedback information, including an assignment of the wireless communication devices to at least one resource unit and at least one modulation alphabet in order to provide high total downlink throughput for the wireless communication devices.

The proposed technology thus also provides an extended, yet efficient mechanism for generating channel feedback signaling to enable optimized resource allocation, including channel allocation and modulation selection, for downlink transmission.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "network device" may generally refer to an electronic device being communicatively connected to other electronic devices in a network context. A network device may for example be seen any device located in connection with a communication network, including but not limited to devices and network nodes in access networks, core networks and similar network structures. The term network device may include any suitable network node. The term network device may also encompass cloud-based network devices.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

For a better understanding of the proposed technology, it may be useful to begin with a brief system overview and/or analysis of the technical problem.

Figure 1:
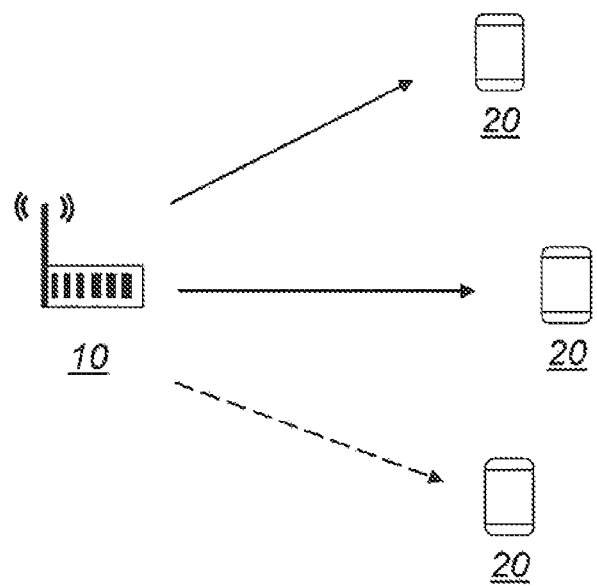
FIG. 1 is a schematic diagram illustrating an example of simultaneous downlink transmission to at least two wireless communication devices in a wireless communication network.
Figure 2:
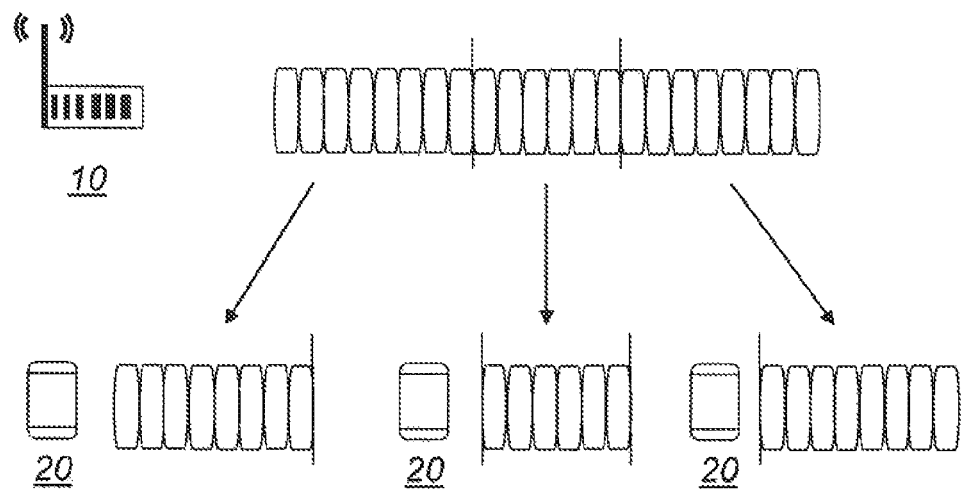
FIG. 2 is a schematic diagram illustrating an example of simultaneous transmission to wireless communication devices on different channels, each channel being defined by a set of subcarriers called a resource unit.

As mentioned, techniques such as Orthogonal Frequency Division Multiple Access, OFDMA, enables simultaneous downlink transmission to wireless communication devices on different frequency channels, as schematically illustrated in FIG. 1 and FIG. 2.

FIG. 1 is a schematic diagram illustrating an example of simultaneous downlink transmission to at least two wireless communication devices in a wireless communication network. A network node 10 such as an access point or base station performs simultaneous downlink transmission to a number of wireless communication devices 20.

FIG. 2 is a schematic diagram illustrating an example of simultaneous transmission to wireless communication devices on different channels, each channel being defined by a set of subcarriers called a resource unit. The network node 10 has a number of sub-carriers allocated for downlink transmission, and can assign different subsets of these sub-carriers to the wireless communication devices. The different subsets thus refer to different channels or resource units.

To maximize downlink system throughput, the network should allocate wireless communication devices on channels such that they in total receive as much throughput as possible. This corresponds to the classical resource allocation problem for downlink OFDMA systems.

However, as mentioned in the background section, the classical resource allocation for downlink OFDMA is not well adapted to the envisaged developments for advanced downlink communication in the future, especially when the degrees of freedom for the overall resource allocation increases and/or there are stricter requirements on the feedback mechanism used as a basis for the resource allocation.

By way of example, the inventors have recognized that OFDMA combined with multi-carrier modulation such as Dual Carrier Modulation, DCM, may have advantages when it comes to possibilities for improved performance, but this also changes the conditions for the underlying resource allocation. For example, with more than a single basic modulation type, or modulation alphabet, it may be possible to perform simultaneous downlink transmission to two or more wireless devices on a single channel or double the amount of transferred data if transmitted on two channels. This means that there are many more possibilities to choose from, and thus the degrees of freedom for the resource allocation problem increases.

The inventors have also recognized that an extended feedback mechanism may be highly beneficial to support such a change of the conditions of the underlying resource allocation problem.

Figure 3:
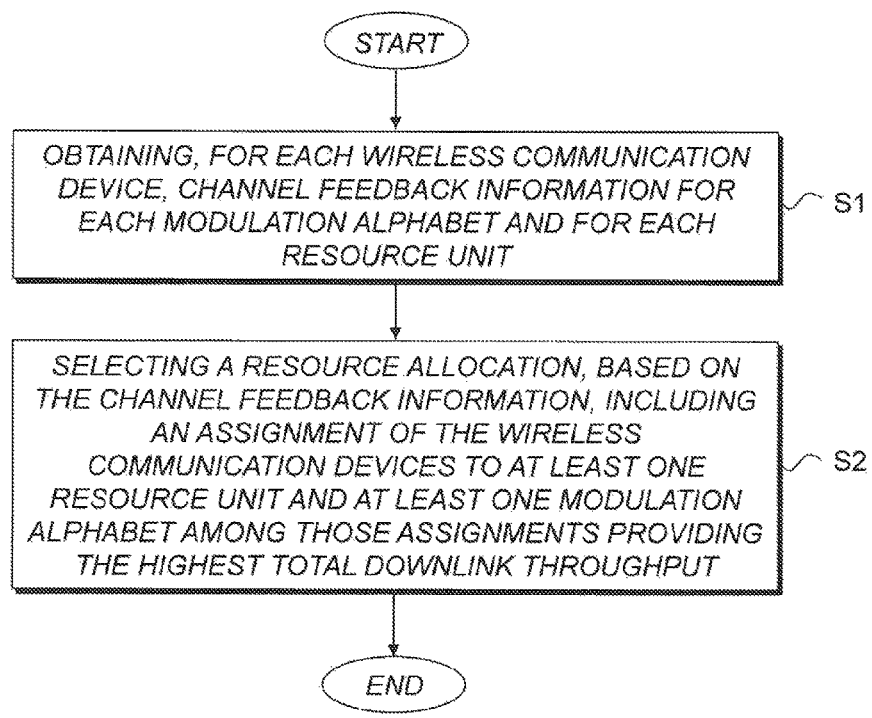
FIG. 3 is a schematic flow diagram illustrating an example of a method for resource allocation for downlink transmission to at least two wireless communication devices in a wireless communication network according to an embodiment.

FIG. 3 is a schematic flow diagram illustrating an example of a method for resource allocation for downlink transmission to at least two wireless communication devices in a wireless communication network according to an embodiment.

Simultaneous transmission to the wireless communication devices is allowed on one or more channels with at least two supported modulation alphabets of different sizes, each channel being defined by a set, called resource unit, of one or more subcarriers.

The method basically comprises the following steps:

S1: obtaining, for each of the wireless communication devices, channel feedback information for each modulation alphabet the wireless communication device supports and for each resource unit on which the wireless communication device is allowed to receive a transmission; and S2: selecting, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

The proposed technology enables highly improved resource allocation based on extended, yet effective channel feedback including, for each wireless communication device, channel feedback information for each modulation alphabet and for each resource unit.

In this way, an optimized resource allocation can be selected, based on the channel feedback information, including an assignment of the wireless communication devices to at least one resource unit and at least one modulation alphabet in order to provide high total downlink throughput for the wireless communication devices.

In a particularly advantageous example, the channel feedback information, for each of the wireless communication devices, is preferably representative of, or represented by, an effective Signal-to-Noise Ratio, SNR, for each supported modulation alphabet and for each resource unit assigned to the wireless communication device.

Figure 4:
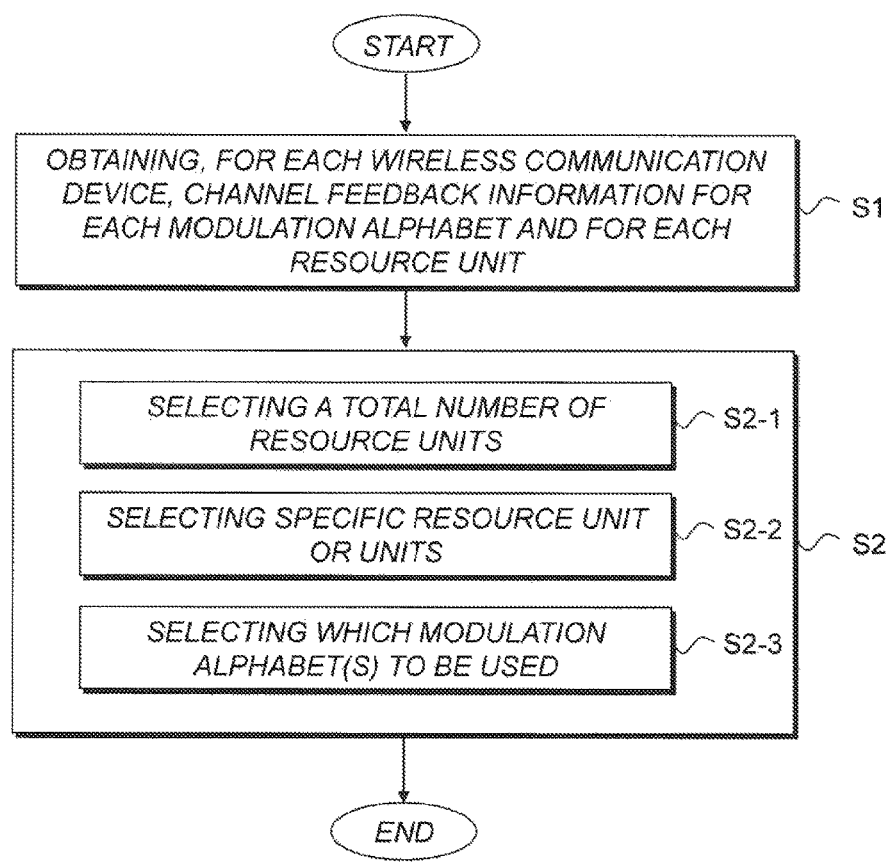
FIG. 4 is a schematic flow diagram illustrating another example of a method for resource allocation for downlink transmission to at least two wireless communication devices in a wireless communication network according to an alternative embodiment.

FIG. 4 is a schematic flow diagram illustrating another example of a method for resource allocation for downlink transmission to at least two wireless communication devices in a wireless communication network according to an alternative embodiment.

According to the example of FIG. 4, the step S2 of selecting an assignment includes:

S2-1: selecting a total number of resource unit(s),

S2-2: selecting specific resource unit or units, to be used for the transmission, S2-3: selecting which modulation alphabet(s) to be used for the transmission.

In another example, the transmit power for the downlink transmission is assigned only to the resource unit(s) to be used for the transmission according to the selected assignment.

In the following examples, the step S2 of selecting an assignment is based on maximization of the total downlink throughput for the wireless communication devices to find an optimal assignment of the wireless communication devices to at least one resource unit and at least one modulation alphabet.

The maximization is a techno-logical procedure in the technical application relating to resource allocation for downlink transmission in a wireless communication network. By way of example, the maximization may be defined as:

$$\underset{x_{i,j,k,l}, y_{j,k,l}}{\text{maximize}} \sum_{i,j,k,l} x_{i,j,k,l} F_{i,j,k,l}$$

wherein index i ($1 \leq i \leq I$) indicates user i where I is the total number of users;

wherein index j ($1 \leq j \leq J$) indicates resource unit j with J being the total number of resource units available;

wherein index k ($1 \leq k \leq K$) indicates number of wireless devices scheduled on a resource unit with K being the maximum allowed value;

wherein index l ($1 \leq l \leq J$) indicates the total number of resource units actually used for the downlink transmission;

wherein $x_{i,j,k,l}$ is a Boolean output variable, where $x_{i,j,k,l}=1$ indicates that wireless communication device i is allocated on resource unit j, with modulation k, along with k−1 other wireless communication devices, when a total of l resource units are used in the downlink; and wherein $y_{j,k,l}$ is a Boolean output variable, where $y_{j,k,l}=1$ indicates that resource unit j is used with modulation k, when a total of l channels are used in the downlink; and wherein $F_{i,j,k,l}$ is a function representing the rate that wireless communication device i will receive on resource unit j with modulation k when a total of l resource units are used in the downlink, wherein the maximization is subject to the following constraints:

$$a) \sum_{(j,k,l)} x_{i,j,k,l} = 1, \quad 1 \leq i \leq I$$

-continued $$b_1) \sum_{(j,k)} y_{j,k,1} = 1 * w_1,$$

$$\ldots$$

$$b_J) \sum_{(j,k)} y_{j,k,J} = J * w_J,$$

$$b_{J+1}) \; w1 + w2 + \ldots w_J = 1;$$

$$c) \sum_{i=1}^{N} x_{i,j,k,l} = k y_{j,k,l},$$

for all combinations of j, k and l ($1 \leq j \leq J$, $1 \leq k \leq K$, $1 \leq l \leq J$) $x_{i,j,k,l}$, $y_{j,k,l}$, $w_l \in \{0,1\}$, where $w_l$ is an auxiliary optimization variable.

In this context, the step S2 of selecting an assignment may include selecting an assignment, when this assignment maximizes the downlink throughput, in which the information is to be transmitted on one resource unit using so-called multi-carrier modulation, with all the transmit power for the downlink transmission assigned to this resource unit.

Alternatively, the step S2 of selecting an assignment may include selecting an assignment, when this assignment maximizes the downlink throughput, in which the information is to be transmitted on two or more resource units using so-called multi-carrier modulation, with the transmit power for the downlink transmission distributed between the resource units.

In yet another alternative, the step S2 of selecting an assignment may include selecting an assignment, when this assignment maximizes the downlink throughput, in which each wireless communication device is assigned to its own resource unit, without using so-called multi-carrier modulation, with the transmit power for the downlink transmission distributed between the resource units.

As an example, the step S1 of obtaining, for each of the wireless communication devices, channel feedback information may comprise the step of extracting the channel feedback information from feedback signaling received from the wireless communication device.

Optionally, the wireless communication network allows simultaneous downlink transmission to the wireless communication devices on one or more channels with at least two supported modulation alphabets of different sizes based on Orthogonal Frequency Division Multiple Access, OFDMA, and multi-carrier modulation such as Dual Carrier Modulation, DCM.

In a particular use case example, the wireless communication network is a wireless network adapted for Long Range Low Power, LRLP, communications.

In a particular example embodiment, at least one channel is defined by a set, called resource unit, of at least two subcarriers.

For example, there may be scenarios where one or a few of the RUs only have one subcarrier, while one or more other RUs have at least two subcarriers.

In many practical applications, each of the channels is defined by a set, RU, of at least two or even multiple subcarriers.

By way of example, the method may be performed by a network device. The network device may be for example a network node a cloud-based network device.

Figure 5:
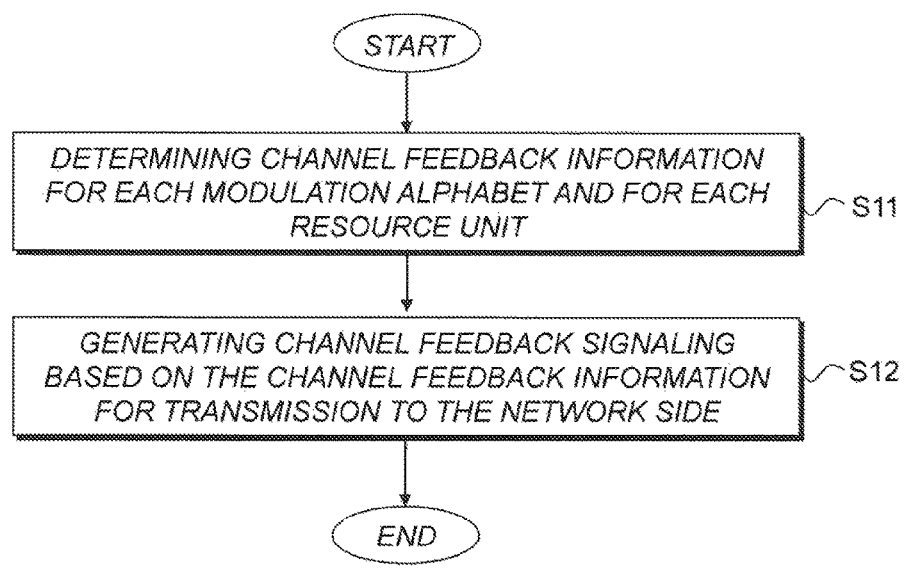
FIG. 5 is a schematic flow diagram illustrating an example of a method, performed by a wireless communication device, for generating channel feedback signaling to enable resource allocation in a wireless communication network.

FIG. 5 is a schematic flow diagram illustrating an example of a method, performed by a wireless communication device, for generating channel feedback signaling to enable resource allocation in a wireless communication network.

The channel feedback signaling enables resource allocation in a wireless communication network for downlink transmission on one or more channels with at least two supported modulation alphabets of different sizes, each channel being defined by a set, called resource unit, of one or more subcarriers.

The method basically comprises the following steps:

S11: determining channel feedback information for each modulation alphabet the wireless communication device supports and for each resource unit on which the wireless communication device is allowed to receive a transmission; and S12: generating channel feedback signaling based on the channel feedback information for transmission to the network side of the wireless communication network.

In this way, the proposed technology provides an extended, yet efficient mechanism for generating channel feedback signaling to enable optimized resource allocation, including channel allocation and modulation selection, for downlink transmission.

In a particularly advantageous example, the channel feedback information is preferably representative of, or represented by, an effective Signal-to-Noise Ratio, SNR, for each supported modulation alphabet and for each resource unit assigned to the wireless communication device.

For example, the step S11 of determining channel feedback information comprises calculating the effective Signal-to-Noise Ratio, SNR, based on achievable information rate for each supported modulation alphabet and for each resource unit assigned to the wireless communication device.

Optionally, the step S11 of determining channel feedback information comprises calculating the effective Signal-to-Noise Ratio, SNR, based on at least one look-up table (LUT) of achievable information rate for each SNR and modulation alphabet.

In a particular example, the wireless communication network allows simultaneous downlink transmission to the wireless communication devices on one or more channels with at least two supported modulation alphabets of different sizes based on Orthogonal Frequency Division Multiple Access, OFDMA, and multi-carrier modulation such as Dual Carrier Modulation, DCM.

In a particular example embodiment, at least one channel is defined by a set, called resource unit, of at least two subcarriers.

In the following the proposed technology will be exemplified with reference to the particular use case of LRLP communications.

There is an increased interest in Long Range Low Power, LRLP, communications within the IEEE 802.11 standardization. At this stage, a study group on LRLP is to be formed, potentially resulting in a new standard initiative in this area.

The main difference between LRLP and, say, 802.11 ax, is that the stations, STAs, in LRLP operate on very low power and low processing complexity. For this reason, some of the techniques proposed for 802.11 ax and other 802.11 standards, are not directly applicable to LRLP. As an example, feedback as it is done in 802.11ac, is not feasible in LRLP since it requires large amounts of feedback data to be sent back. This requires both a lot of processing at the STA to compute all the feedback data and a longer transmission. For this reason, there should be an alternative feedback mechanism in LRLP that still provides substantial throughput gains compared to no feedback.

Downlink OFDMA is a method that is expected to be used in LRLP. Hence, the AP will be able to send downlink, DL, data to multiple STAs, on different frequency channels, with the total available power distributed only on channels actually used for transmission. To maximize DL system throughput, the AP should allocate STAs on channels such that they in total receive as much throughput as possible, and should distribute available transmitting power only on channels actually used for transmission. From this perspective, this corresponds to a classical resource allocation problem in DL OFDMA systems, as previously indicated. However, the resource allocation problem tackled herein is significantly different from the classical DL OFDMA scheduling problem, e.g. due to the type of feedback that is sent by the STAs and the novel introduction of a DCM mechanism in LRLP.

In DCM, for example, the same information may be transmitted on two different channels or carriers, and at the receiver side the received information on the two carriers may be combined. In order not to reduce the transmission rate, the amount of information sent on each one of the channels used for DCM is doubled. As an example, suppose that an Access Point, AP, in WiFi is to send information to two STAs, and moreover suppose that Binary Phase Shift Keying, BPSK, is used to both STAs. If DCM is not used, then the available bandwidth could for instance be shared between the two STAs such that STA1 gets the lower frequency part of the channel whereas STA2 gets the upper frequency of the channel. With DCM, the information is instead repeated for the two STAs such that the same information is sent on both the lower and the upper part of the band. However, in order to achieve this Quadrature Phase Shift Keying, QPSK, may be used instead of BPSK. On one hand, the reception of the signal will be slightly more complex. For example, user 1 will decode the In-phase (I) part and user 2 will decode the Quadrature-phase (Q) part of the QPSK signal. On the other hand, there may be a significant gain due to the increased frequency diversity.

In order for the AP to calculate the achievable information rate to an STA on different channels, both with and without DCM, it needs some feedback information from the STA. In 802.11ac, the feedback that is sent by an STA is basically the channel estimate for each subcarrier across the frequency channel. From this, the AP can calculate the achievable information rate to the STA. However, as described above, this would entail a large power consumption at the STA.

Applying the conventional feedback mechanism from 802.11ac or the future 802.11 ax standard to LRLP will result in comparatively large power consumption at the LRLP devices.

Therefore, in this particular use case, it is proposed to use the novel feedback mechanism based on effective SNR as described herein for LRLP to produce throughput gains at low power consumption and limited processing complexity at each LRLP STA.

In the following, the proposed technology will be described with reference to non-limiting examples, sometimes with special reference to APs and STAs, but it should be understood that the proposed technology is indeed generally applicable to any network devices and wireless communication devices.

In the following, non-limiting example, a new feedback mechanism (with little feedback from STAs) is introduced where each STA feedbacks the achievable effective SNR (e.g. calculated with the help of tables of RBIR, received bit information rate) or a representation thereof on each channel assigned to it by the AP, for each supported modulation alphabet.

Based on this information (from each STA) available at the AP, a resource allocation procedure can be performed at the AP (or similar network device) to maximize the sum throughput in the downlink.

This resource allocation problem differs from typical OFDMA resource allocation problems, such as [2], since it works with information rates for finite alphabets and not Gaussian alphabets; hence, the information rate in this case is not well approximated by logarithm functions. Moreover, the resource allocation according to the proposed technology allows several STAs to be scheduled on the same channel, e.g. by using multi-carrier modulation such as DCM, in contrast to many OFDMA resource allocation problems in the literature, including [3]. In this way, bandwidth saving can occur as well, since not all channels are used in the downlink if some STAs use the same channel.

The proposed solution according to this particular example results in higher downlink throughput to the STAs, with very little feedback by the STAs compared to current 802.11 standards. Thus, the proposed technology is highly suitable, e.g. for LRLP scenarios. Moreover, by implementing the proposed procedure a) the AP can distribute transmitting power only across channels actually used without wasting it on channels no one will be listening to, and b) multi-carrier modulation such as DCM modulation is an option and is used only when it gives higher throughput.

The mechanism described herein can be extended to MIMO devices, but in the following the focus will be on single antenna devices (single antenna AP and single antenna STAs) for simplicity.

To ease the description, an IEEE 802.11-like system using orthogonal frequency division multiplexing (OFDM) will now be assumed, without loss of generality. Specifically, it is assumed in this example that the nominal channel bandwidth is 20 MHz, that the signal is generated using a 256 point inverse fast Fourier transform (IFFT), so that the sub-carrier spacing becomes 20/256 MHz=78.125 kHz, and that the duration of one OFDMA symbol is 256/20 us=12.8 us, not including the cyclic prefix (CP).

As is proposed for IEEE 802.11ax [1] OFDMA is used to allow simultaneous transmission to and from several STAs.

Depending on how much information that should be transmitted to a STA, the STA can be allocated more or less of the total available bandwidth. In a particular example, the smallest resource unit (RU) can for example be composed of 26 sub-carriers, which corresponds to a bandwidth of about 2 MHz (26*78.125 kHz=2.031 MHz). In the considered example, a STA may be allocated a 26 sub-carrier RU, a 52 sub-carrier RU, a 106 sub-carrier RU, or the full bandwidth which corresponds to 242 sub-carriers.

It is assumed that the AP supports transmission and reception over the entire 20 MHz BW, whereas different types of LRLP STAs may have the capability to receive 1) over a single 26 sub-carrier RU, or 2) over a single 52 sub-carrier RU, or 3) over a single 106 sub-carrier RU. If a LRLP STA can receive on the whole bandwidth, DCM operation as detailed below is not needed.

Although the proposed scheme can be applied to all the three cases listed above (when LRLP STA receives on 26, 52 or 106 sub-carriers RU) in the following, for simplicity, operation is described when only two 106 sub-carrier RUs are available for transmissions. So if, for example, we consider N=2 STAs, three cases are in general possible: a) no DCM is used and each STA receives its own BPSK signal on its own channel, b) DCM is activated and a QPSK signal is transmitted on one channel (each STA then decodes its own component, either in-phase or quadrature-phase), c) DCM is activated an a QPSK signal (the same) is transmitted on both channels.

According to a particular example, each STA feedbacks the effective SNR (e.g. calculated with the help of tables of RBIR) on each RU assigned to it, and for each possible modulation alphabet that it can receive.

Any STA can be made aware of which two RUs have been allocated to it by the AP. STAs may for example be informed before actual DCM transmission starts by means of a trigger frame. Once the STA is made aware of what RUs have been allocated to it, the STA can gather the information relative to each RU of interest. Finally the information is sent to the AP.

For example, the AP broadcasts a trigger frame which comprises information about what RUs will be used for an upcoming DCM DL transmission for various LRLP STAs (possibly along with other information, such as modulation and expected DCM DL time). Following this, the AP continues with other transmissions, which can, for instance, be intended for non-LRLP stations. The LRLP STAs that find themselves marked in the Trigger frame (that they will receive DCM transmission) may then use these non-LRLP transmissions to estimate the channel quality (in one RU at a time). Specifically, although the LRLP STAs may not be able to decode the packets, they can use them to estimate the received power in a bandwidth corresponding to the RUs where they expect DCM reception later on. Having estimated the channel on the expected RUs, an LRLP STA may go to sleep and wake up close to the expected time of the DCM DL transmission. The STA then listens to this transmission only on the RU where it had found the channel to be best.

With the achievable information rate for each STA available at the AP or similar network device, a resource allocation procedure is performed, preferably to maximize the sum throughput in the downlink.

By way of example, the STA may calculate the effective SNR across its RUs for different modulation alphabets, and feed back this calculation to the network side such as the AP. In a particular example, BPSK and QPSK may be considered. However, the proposed solution can be generalized for higher-order modulations. The calculation of the effective SNR, for a given transmitting power, can be done very fast and at low complexity at the STA, e.g. through tables of information rate for each SNR and modulation alphabet. There are already existing tables of RBIR that can be saved in the memory of each STA, and thus a quick search in this table will give the STA the achievable information rate for each modulation alphabet and from this the effective SNR for each RU and modulation alphabet. Hence, we propose that each STA calculates the effective SNR for each modulation alphabet on each RU (for a given transmitting power) where it possibly can receive information, and feeds back this information to the AP.

For more information on how to calculate the effective SNR, reference can be made to [4].

For example, assume that an STA has been assigned two possible RUs by the AP for the DL transmission (note however that the STA will only process one RU in the end, but it has the possibility to choose which), and the data would be one out of two possible modulation alphabets (e.g. BPSK and QPSK). The STA may thus calculate the effective SNR on each RU, for each of the two modulation alphabets that it can receive from the AP, and then feedback this information to the AP.

In total, the feedback from the STA would then consist of 2*2=4 numbers. This is a significant saving compared to feeding back channel information on each subcarrier for the three frequency channels, which would be (at least) a feedback of 2*26=52 numbers. Even if grouping of subcarriers (as done in 802.11ac) would be used to reduce the number of subcarriers used in the feedback, the overhead compared to feeding back effective SNR/information rate is significantly larger.

Example—Optimization Problem at the Network Side

In this example, it is assumed that each STA should receive BPSK symbols. This is expected to be a common case in LRLP situations, since BPSK is the most robust modulation. When DCM is activated on a certain channel for two users, QPSK is used. In the following, the description is limited to the case where only BPSK and QPSK modulation are available, and at most 2 users can transmit on the same channel, but the described operation can be extended to higher modulation and $2^n$ users can in principle share a channel, with n integer.

In similarity to what has been previously described, the following assumptions are made:

index i ($1<=i<=I$) indicates user i where I is the total number of users (I=2, in the example above), index j ($1<=j<=J$) indicates RU j with J being the total number of RUs available (J=2, in the example above), index k ($1<=k<=K$) indicates number of STAs scheduled on an RU (in the example above, K=2, since the only modulations allowed on an RU are BPSK and QPSK), index l ($1<=l<=J$) indicates the total number of RUs used for the DL transmissions (in the example above, l=2 would be with no DCM, while l=1 would be with DCM activated where both users share the same RU).

Now, the AP can formulate the following resource allocation optimization problem (J=2, K=2 in the example above, but that can be generalized easily):

$$\underset{x_{i,j,k,l}, y_{j,k,l}}{\text{maximize}} \sum_{i,j,k,l} x_{i,j,k,l} F_{i,j,k,l}$$

subject to $$a) \sum_{(j,k,l)} x_{i,j,k,l} = 1, \quad 1 \leq i \leq I$$

$$b_1) \sum_{(j,k)} y_{j,k,1} = 1 * w_1,$$

$$\ldots$$

$$b_J) \sum_{(j,k)} y_{j,k,J} = J * w_J,$$

$$b_{J+1})\ w1 + w2 + \ldots w_J = 1;$$

$$c) \sum_{i=1}^{N} x_{i,j,k,l} = k y_{j,k,l},$$

for all combinations of j, k and l ($1\leq j\leq J$, $1\leq k\leq K$, $1\leq l\leq J$)
$x_{i,j,k,l}, y_{j,k,l}, w_l \in \{0,1\}$ If $x_{i,j,k,l}=1$, then this means that STA i is allocated on channel j, along with k−1 other STAs (hence DCM with alphabet size $2^k$ is used on channel j), where a total of l RUs are used in the downlink.

Expressed slightly differently, this indicates that the system will use in total l channels, from which channel j will be used by STA i, with modulation set to modulation number k.

If $y_{j,k,l}=1$, then this indicates that channel j carries DCM with modulation $2^k$ and that a total of l channels are used in the downlink.

The constraint a) expresses that each STA can only receive information on a single RU.

Constraints $b_1, \ldots, b_{J+1}$) express that either there are 1 or 2 or 3 or ... or J RUs scheduled in the downlink. Hence, only one of $b_1, \ldots, b_J$ can be active, which is expressed through constraint $b_{J+1}$. These constraints are necessary so that the optimal solution produces consistent solutions, i.e., it should not be able to produce a solution where, say, 2 and 4 channels are used in the DL, which is an absurdity—only one of these can be true at one time.

The constraint c) for fixed values of j, k and l, says that RU j is either empty (no transmission on this RU), which happens when $y_{j,k,l}=0$, or it contains k STAs when a total of l RUs are used in the downlink (when $y_{j,k,l}=1$).

This can be solved efficiently for moderate sizes with integer programming procedures.

The function $F_{i,j,k,l}$ denotes the rate that STA i will receive on RU j with modulation number $2^k$ when a total of l RUs are used in the DL transmission. For small alphabet sizes, such as BPSK and DCM with QPSK, it is easy to calculate $F_{i,j,k,l}$. Clearly, $F_{i,j,k,l}$ is a function of the effective SNRs that STA i has fed back to the AP. As an example, with BPSK and DCM with QPSK, we have $$F_{i,j,1,l} = R_1\left(\frac{SNR_{i,j,1}}{l}P\right),$$

where $R_1$ is the RBIR function for a BPSK alphabet (which is, as mentioned before, easily calculated in advance for different SNR values and modulations and stored at the STAs and the AP), $SNR_{i,j,1}$ is the effective SNR that was fed back by STA i on RU j assuming BPSK modulation on RU j (thus, k=1 in this case), and P is the total power used by the AP in the DL transmission. Note that since l RUs are used in the DL in this case, the total power is divided evenly among these RUs, and hence the effective SNR that was reported by the STA is thus scaled with $$\frac{P}{l}.$$

On the other hand, if DCM with QPSK is used, then we have $$F_{i,j,2,l} = R_1\left(\frac{SNR_{i,j,1}P}{\sqrt{2}\,l}\right)$$

(note that k=2 in this case since DCM with QPSK is only used when two STAs are scheduled on an RU). This is so since in this case, effectively, STA i receives a BPSK alphabet with half the energy (since the other bit in the QPSK symbol is intended for another STA).

Hence, this shows that for BPSK alphabets and DCM with QPSK, it is possible to in advance calculate the values $F_{i,j,k,l}$ from the received effective SNRs by each STA. Note that the above optimization problem also includes cases when DCM uses 16 QAM or higher alphabets.

In this example, each STA thus feedbacks effective SNR values or corresponding representations thereof for each modulation alphabet that it can receive (BPSK, QPSK, or higher) and on each RU which it can receive across. This feedback is far less than feeding back the channels on individual subcarriers.

From the received effective SNR values from each STA, the AP or similar network device performs the resource allocation procedure described herein.

This technological procedure may thus provide an assignment from a set of assignments of STAs to different channels and different modulations so that the total DL throughput is maximized.

In the following, a simple example will be given to demonstrate that the above resource allocation produces better results than straightforward application of DCM.

In this example, a scenario with 2 STAs and 2 RUs is considered.

The AP has the following possibilities:
1) Assign each STA to its own RU, and transmit BPSK to each STA where the total power is evenly divided for the two RUs.
2) Use DCM with QPSK alphabet, and transmit the same QPSK symbols on the two RUs (i.e., the QPSK symbols on each subcarrier of one RU are the same as QPSK symbols on corresponding subcarriers on the other RU).
3) Use DCM with QPSK alphabet, but only transmit across one RU, with all power assigned to this RU.

Assume that for both STAs, RU 1 is much better than RU 2, meaning that RU1 produces higher RBIRs for each modulation than RU 2.

In this case, it is optimal for the AP to transmit all information on RU 1 only—that is, use DCM with QPSK on RU 1 only. Hence, strategy 3 is optimal in this case.

This solution is different than typical DCM transmission, which typically uses strategy 2 to achieve diversity (each STA can choose to either receive on RU 1 or 2, since the same information is on both RUs, and hence achieve a diversity gain).

However, this example shows that strategy 2 is suboptimal in this case even though one achieves a diversity gain, and the proposed technology described herein would output the optimal strategy (strategy 3).

On the other hand, assume that RU 1 is far better than RU 2 for STA 1, and RU 2 is far better than RU 1 for STA 2. In this case, the optimal way of signaling is to transmit BPSK to STA1 on RU 1 and BPSK to STA2 on RU 2.

Hence, depending on the RU quality, the AP will use different strategies. This behavior is captured by the novel resource allocation procedure described in various forms herein. Taking a wrong strategy can significantly reduce the downlink throughput.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The actual hardware-software partitioning can be decided by a system designer based on a number of factors including processing speed, cost of implementation and other requirements.

According to an aspect, there is also provided an arrangement configured to perform resource allocation for downlink transmission to at least two wireless communication devices in a wireless communication network. Simultaneous transmission to the wireless communication devices is allowed on one or more channels with at least two supported modulation alphabets of different sizes, each channel being defined by a set, called resource unit, of one or more subcarriers.

The arrangement is configured to obtain, for each of the wireless communication devices, channel feedback information for each modulation alphabet the wireless communication device supports and for each resource unit on which the wireless communication device is allowed to receive a transmission.

The arrangement is also configured to select, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

By way of example, the arrangement may be configured to obtain channel feedback information, for each of the wireless communication devices, that is representative of an effective Signal-to-Noise Ratio, SNR, for each supported modulation alphabet and for each resource unit assigned to the wireless communication device.

As an example, the arrangement may be configured to select an assignment by selecting a total number of resource unit(s), including selecting specific resource unit or units, to be used for the transmission, and also selecting which modulation alphabet(s) to be used for the transmission.

Optionally, the arrangement is configured to assign the transmit power for the downlink transmission only to the resource unit(s) to be used for the transmission according to the selected assignment.

In a particular example, the arrangement is configured to select an assignment based on maximization of the total downlink throughput for the wireless communication devices to find an optimal assignment of the wireless communication devices to at least one resource unit and at least one modulation alphabet.

For example, the arrangement may be configured to perform the maximization as follows:

$$\underset{x_{i,j,k,l}, y_{j,k,l}}{\text{maximize}} \sum_{i,j,k,l} x_{i,j,k,l} F_{i,j,k,l}$$

wherein index i ($1 \leq i \leq I$) indicates user i where I is the total number of users;

wherein index j ($1 \leq j \leq J$) indicates resource unit j with J being the total number of resource units available;

wherein index k ($1 \leq k \leq K$) indicates number of wireless devices scheduled on a resource unit with K being the maximum allowed value;

wherein index l ($1 \leq l \leq J$) indicates the total number of resource units actually used for the downlink transmission;

wherein $x_{i,j,k,l}$ is a Boolean output value, where $x_{i,j,k,l}=1$ indicates that wireless communication device i is allocated on resource unit j, with modulation k, along with k-1 other wireless communication devices, when a total of l resource units are used in the downlink; and wherein $y_{j,k,l}$ is a Boolean output variable, where $y_{j,k,l}=1$ indicates that resource unit j is used with modulation k, when a total of l channels are used in the downlink; and wherein $F_{i,j,k,l}$ is a function representing the rate that wireless communication device i will receive on resource unit j with modulation k when a total of l resource units are used in the downlink.

wherein the arrangement is configured to perform the maximization subject to the following constraints:

$$a) \sum_{(j,k,l)} x_{i,j,k,l} = 1, \quad 1 \leq i \leq I$$

$$b_1) \sum_{(j,k)} y_{j,k,1} = 1 * w_1,$$

...

$$b_J) \sum_{(j,k)} y_{j,k,J} = J * w_J,$$

$$b_{J+1}) \, w1 + w2 + \ldots w_J = 1;$$

$$c) \sum_{i=1}^{N} x_{i,j,k,l} = k y_{j,k,l},$$

for all combinations of j, k and l ($1 \leq j \leq J$, $1 \leq k \leq K$, $1 \leq l \leq J$) $x_{i,j,k,l}$, $y_{j,k,l}$, $w_l \in \{0,1\}$, where $w_l$ is an auxiliary optimization variable.

By way of example, the arrangement may be configured to select an assignment, when this assignment maximizes the downlink throughput, in which the information is to be transmitted on one resource unit using so-called multi-carrier modulation, with all the transmit power for the downlink transmission assigned to this resource unit.

Alternatively, the arrangement may be configured to select an assignment, when this assignment maximizes the downlink throughput, in which the information is to be transmitted on two or more resource units using so-called multi-carrier modulation, with the transmit power for the downlink transmission distributed between the resource units, when this assignment maximizes the downlink throughput.

In yet another alternative, the arrangement is configured to select an assignment, when this assignment maximizes the downlink throughput, in which each wireless communication device is assigned to its own resource unit, without using multi-carrier modulation, with the transmit power for the downlink transmission distributed between the resource units.

As an example, the arrangement is configured to obtain, for each of the wireless communication devices, channel feedback information by extracting the channel feedback information from feedback signaling received from the wireless communication device.

In a particular example, as previously mentioned, the wireless communication network allows simultaneous downlink transmission to the wireless communication devices on one or more channels with at least two supported modulation alphabets of different sizes based on Orthogonal Frequency Division Multiple Access, OFDMA, and multi-carrier modulation such as Dual Carrier Modulation, DCM.

In a specific use case example, the wireless communication network is a wireless network adapted for Long Range Low Power, LRLP, communications.

In a particular example embodiment, at least one channel is defined by a set, called resource unit, of at least two subcarriers.

Figure 6:
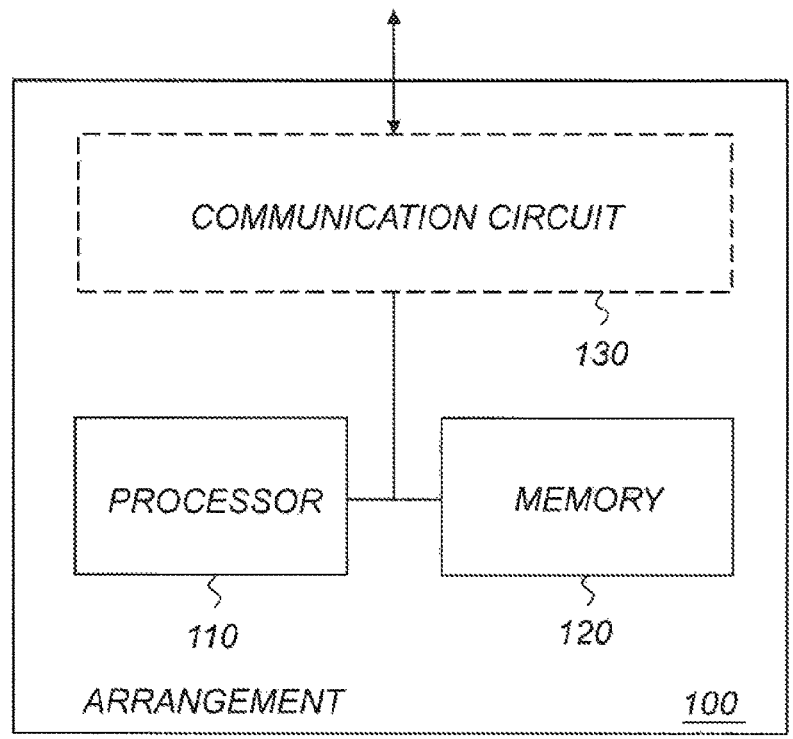
FIG. 6 is a schematic block diagram illustrating an example of an arrangement configured to perform resource allocation for downlink transmission to at least two wireless communication devices in a wireless communication network according to an embodiment.

FIG. 6 is a schematic block diagram illustrating an example of an arrangement configured to perform resource allocation for downlink transmission to at least two wireless communication devices in a wireless communication network according to an embodiment.

In this example, the arrangement 100 comprises at least one processor 110 and memory 120, the memory 120 comprising instructions, which when executed by the at least one processor 110, cause the at least one processor 110 to perform resource allocation.

Optionally, the arrangement/system 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 7:
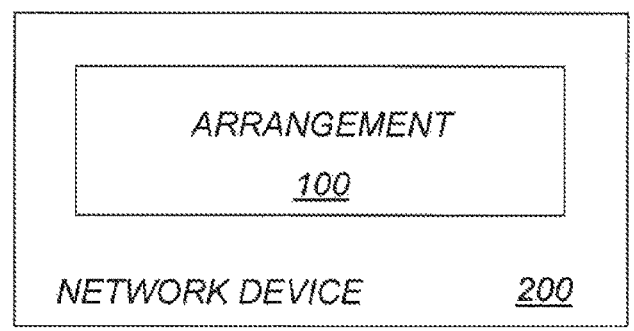
FIG. 7 is a schematic block diagram illustrating an example of a network device comprising an arrangement of FIG. 6.

FIG. 7 is a schematic block diagram illustrating an example of a network device comprising an arrangement of FIG. 6. In this example, the network device 200 comprises the arrangement 100. By way of example, the network device 200 may be a network node or a cloud-based network device.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a wireless communication device configured to generate channel feedback signaling for enabling resource allocation in a wireless communication network for downlink transmission on one or more channels with at least two supported modulation alphabets of different sizes, each channel being defined by a set, called resource unit, of one or more subcarriers.

The wireless communication device is configured to determine channel feedback information for each modulation alphabet the wireless communication device supports and for each resource unit on which the wireless communication device is allowed to receive a transmission.

The wireless communication device is also configured to generate channel feedback signaling based on the channel feedback information for transmission to the network side of the wireless communication network.

In a particular example, the wireless communication device is configured to determine channel feedback information as representative of an effective Signal-to-Noise Ratio, SNR, for each supported modulation alphabet and for each resource unit assigned to the wireless communication device.

By way of example, the wireless communication device may be configured to calculate the effective Signal-to-Noise Ratio, SNR, based on achievable information rate for each supported modulation alphabet and for each resource unit assigned to the wireless communication device.

For example, the wireless communication device may be configured to calculate the effective Signal-to-Noise Ratio, SNR, based on at least one look-up table (LUT) of achievable information rate for each SNR and modulation alphabet.

Figure 8:
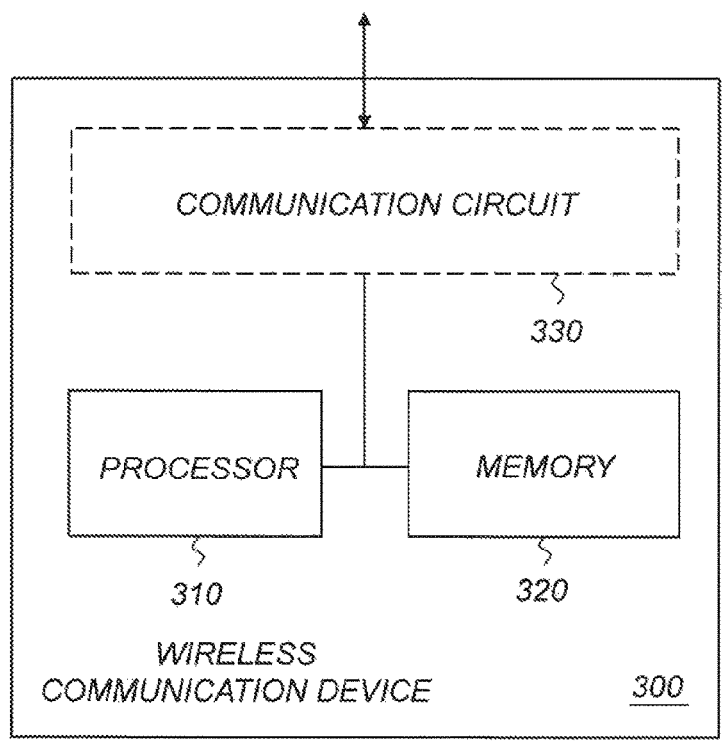
FIG. 8 is a schematic block diagram illustrating an example of a wireless communication device configured to generate channel feedback signaling for enabling resource allocation in a wireless communication network according to an embodiment.

FIG. 8 is a schematic block diagram illustrating an example of a wireless communication device configured to generate channel feedback signaling for enabling resource allocation in a wireless communication network according to an embodiment.

In this example, the wireless communication device 300 comprises at least one processor 310 and memory 320, the memory 320 comprising instructions, which when executed by the at least one processor, cause the at least one processor to generate channel feedback signaling for enabling channel allocation and modulation selection.

Optionally, the wireless communication device 300 may also include a communication circuit 330. The communication circuit 330 may include functions for wired and/or wireless communication with other devices and/or network nodes in the network. In a particular example, the communication circuit 330 may be based on radio circuitry for communication with one or more other nodes, including transmitting and/or receiving information. The communication circuit 330 may be interconnected to the processor 310 and/or memory 320. By way of example, the communication circuit 330 may include any of the following: a receiver, a transmitter, a transceiver, input/output (I/O) circuitry, input port(s) and/or output port(s).

In a particular use case example, the wireless communication network allows simultaneous downlink transmission to the wireless communication devices on one or more channels with at least two supported modulation alphabets of different sizes based on Orthogonal Frequency Division Multiple Access, OFDMA, and multi-carrier modulation such as Dual Carrier Modulation, DCM.

In a particular example embodiment, at least one channel is defined by a set, called resource unit, of at least two subcarriers.

Figure 10:
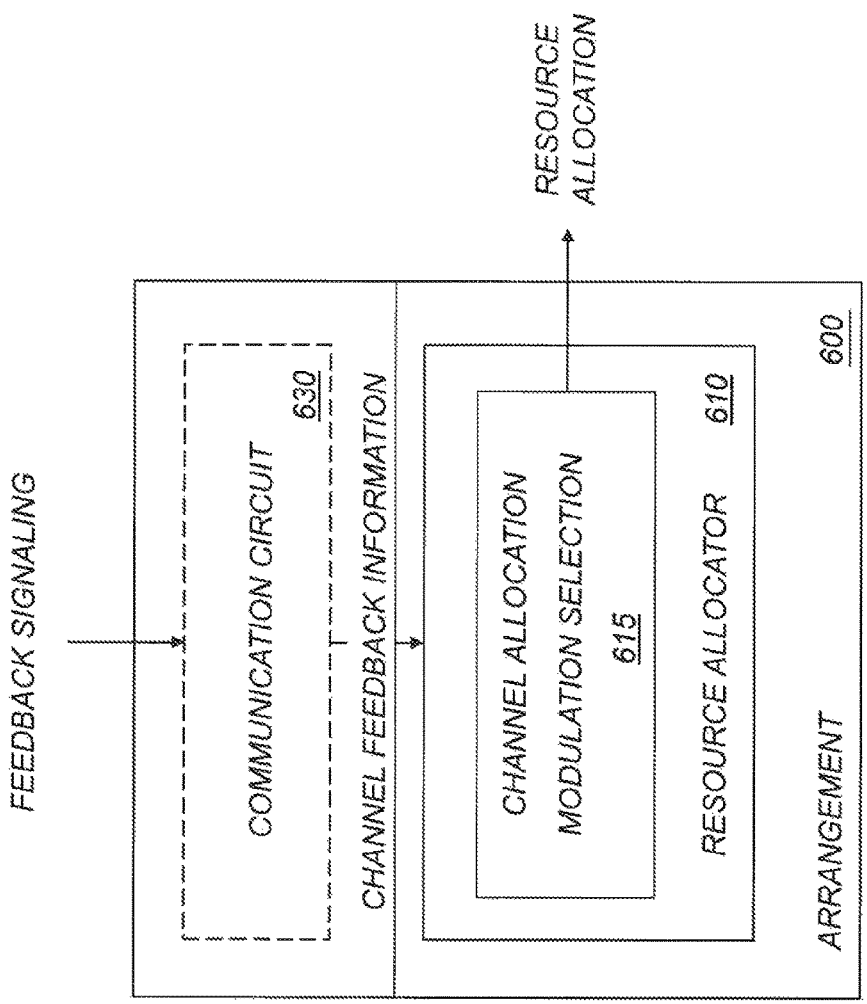
FIG. 10 is a schematic block diagram illustrating another example of an arrangement configured to perform resource allocation for downlink transmission to at least two wireless communication devices in a wireless communication network according to an alternative embodiment.

FIG. 10 is a schematic block diagram illustrating another example of an arrangement configured to perform resource allocation for downlink transmission to at least two wireless communication devices in a wireless communication network according to an alternative embodiment. In this example, the arrangement 600 comprises a resource allocator 610, which in turn comprises a module 615 for channel allocation and modulation selection operating according to the resource allocation procedure described herein. The resource allocator 610 is configured to obtain channel feedback information as input to provide a resource allocation as output.

Optionally, the arrangement 600 comprises a communication circuit 630, which is configured to receive feedback signaling originating from wireless communication devices and extract the channel feedback information form the feedback signaling.

Figure 11:
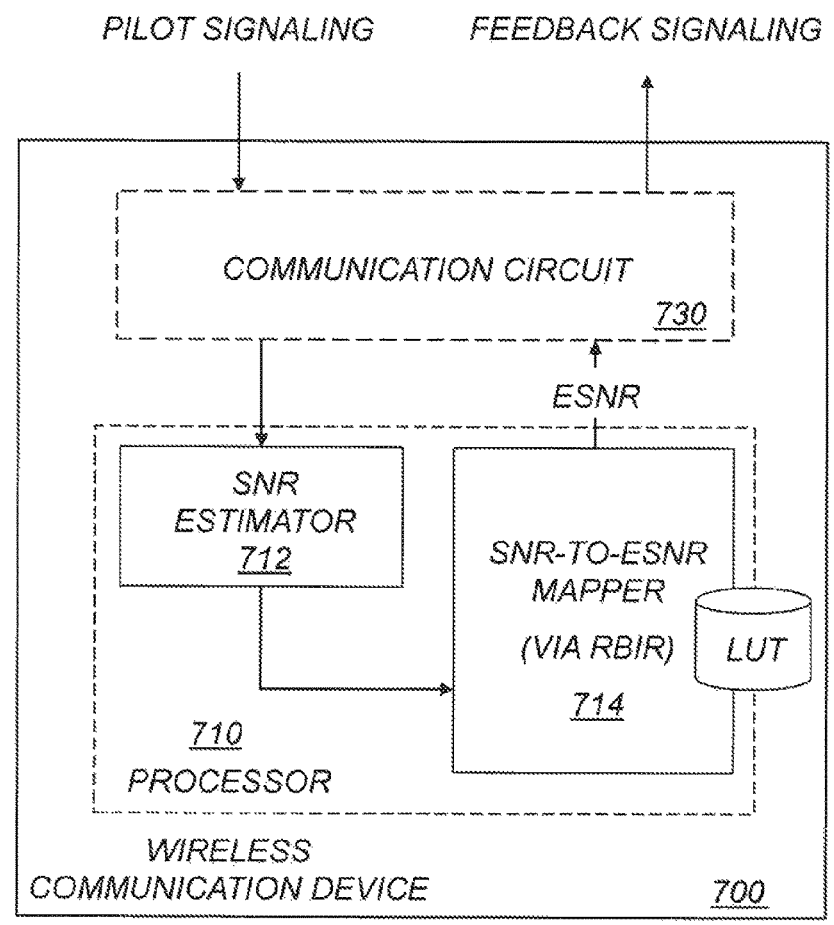
FIG. 11 is a schematic block diagram illustrating another example of a wireless communication device configured to generate channel feedback signaling for enabling resource allocation in a wireless communication network according to an alternative embodiment.

FIG. 11 is a schematic block diagram illustrating another example of a wireless communication device configured to generate channel feedback signaling for enabling resource allocation in a wireless communication network according to an alternative embodiment. In this example, the wireless communication device 700 comprises a SNR estimator 712 and an SNR-to-ESNR mapper 714. The wireless communication device 700 may also comprise a communication circuit 730, which is configured to receive pilot signaling and transmit feedback signaling. The received pilot signaling can be used as a basis for the SNR estimator 712 to provide SNR estimates. The SNR estimates produced by the SNR estimator 712 may be used as input to the SNR-to-ESNR mapper 714 to determine ESNR estimates. Preferably, the SNR-to-ESNR mapper 714 transforms the SNR estimates to ESNR estimates via RBIR values and may use Look-Up Table, LUT, technology for this purpose, as previously exemplified.

Optionally, the SNR estimator 712 and SNR-to-ESNR mapper 714 may be implemented, at least partly by a processor 710.

Figure 9:
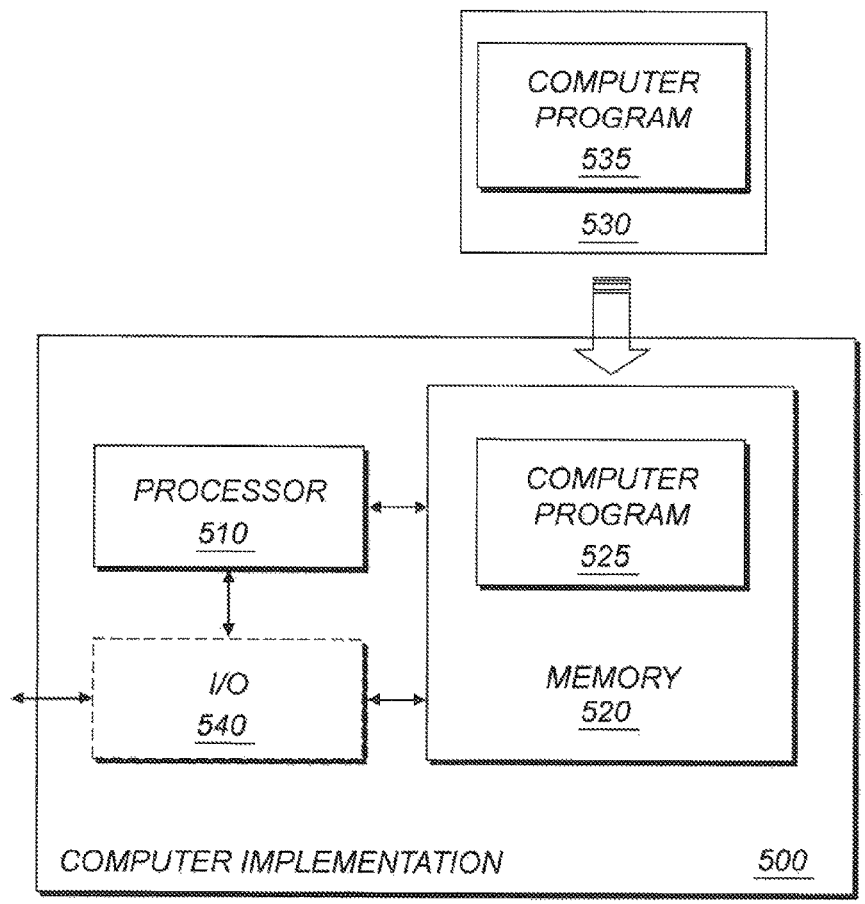
FIG. 9 is a schematic block diagram illustrating an example of a computer implementation according to an embodiment.

FIG. 9 is a schematic block diagram illustrating an example of a computer implementation 500 according to an embodiment. In this particular example, at least some of the steps, functions, procedures, modules and/or blocks described herein are implemented in a computer program 525; 535, which is loaded into the memory 520 for execution by processing circuitry including one or more processors 510. The processor(s) 510 and memory 520 are interconnected to each other to enable normal software execution. An optional input/output device 540 may also be interconnected to the processor(s) 510 and/or the memory 520 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 510 is thus configured to perform, when executing the computer program 525, well-defined processing tasks such as those described herein.

The processing circuitry does not have to be dedicated to only execute the above-described steps, functions, procedure and/or blocks, but may also execute other tasks.

In a particular embodiment, there is provided a computer program 525; 535 for performing, when executed, resource allocation for downlink transmission to at least two wireless communication devices in a wireless communication network, wherein simultaneous transmission to the wireless communication devices is allowed on one or more channels with at least two supported modulation alphabets of different sizes, each channel being defined by a set, called resource unit, of one or more subcarriers.

The computer program 525; 535 comprises instructions, which when executed by at least one processor, cause the at least one processor to:

obtain, for each of the wireless communication devices, channel feedback information for each modulation alphabet the wireless communication device supports and for each resource unit on which the wireless communication device is allowed to receive a transmission; and select, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

In a particular example embodiment, at least one channel is defined by a set, called resource unit, of at least two subcarriers.

In another particular embodiment, there is provided a computer program 525; 535 for generating, when executed, channel feedback signaling to enable resource allocation in a wireless communication network for downlink transmission on one or more channels with at least two supported modulation alphabets of different sizes, each channel being defined by a set, called resource unit, of one or more subcarriers.

The computer program 525; 535 comprises instructions, which when executed by at least one processor, cause the at least one processor to:

determine channel feedback information for each modulation alphabet the wireless communication device supports and for each resource unit on which the wireless communication device is allowed to receive a transmission; and generate channel feedback signaling based on the channel feedback information for transmission to the network side of the wireless communication network.

In a particular example embodiment, at least one channel is defined by a set, called resource unit, of at least two subcarriers.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 525; 535 may be realized as a computer program product, which is normally carried or stored on a computer-readable medium 520; 530, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
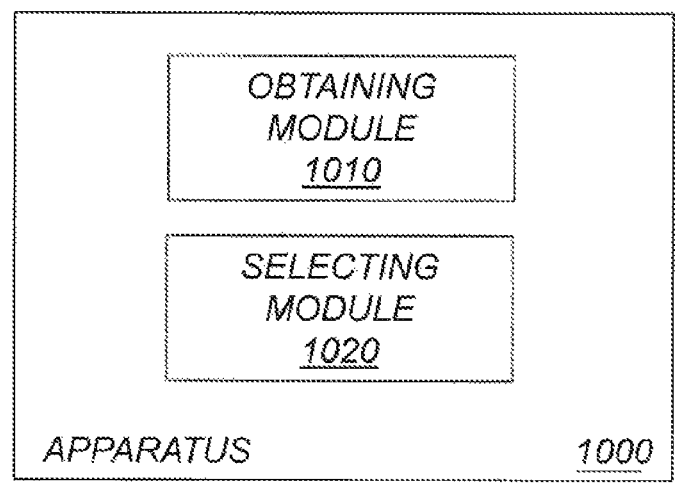
FIG. 13 is a schematic block diagram illustrating an example of an apparatus for resource allocation for downlink transmission to at least two wireless communication devices in a wireless communication network.

FIG. 13 is a schematic block diagram illustrating an example of an apparatus for resource allocation for downlink transmission to at least two wireless communication devices in a wireless communication network. Simultaneous transmission to the wireless communication devices is allowed on one or more channels with at least two supported modulation alphabets of different sizes, each channel being defined by a set, called resource unit, of one or more subcarriers. The apparatus 1000 comprises an obtaining module 1010 for obtaining, for each of the wireless communication devices, channel feedback information for each modulation alphabet the wireless communication device supports and for each resource unit on which the wireless communication device is allowed to receive a transmission. The apparatus 1000 also comprises a selecting module 1020 for selecting, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices.

In a particular example embodiment, at least one channel is defined by a set, called resource unit, of at least two subcarriers.

Figure 14:
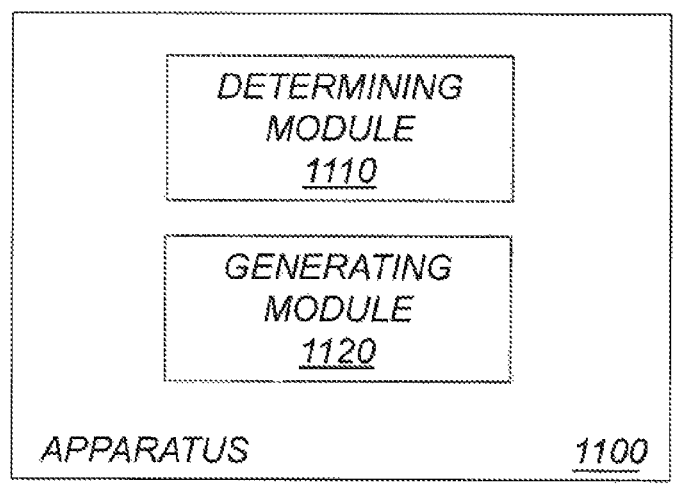
FIG. 14 is a schematic block diagram illustrating an example of an apparatus for generating channel feedback signaling to enable resource allocation in a wireless communication network.

FIG. 14 is a schematic block diagram illustrating an example of an apparatus for generating channel feedback signaling to enable resource allocation in a wireless communication network for downlink transmission on one or more channels with at least two supported modulation alphabets of different sizes, each channel being defined by a set, called resource unit, of one or more subcarriers. The apparatus 1100 comprises a determining module 1110 for determining channel feedback information for each modulation alphabet the wireless communication device supports and for each resource unit on which the wireless communication device is allowed to receive a transmission. The apparatus 1100 also comprises a generating module (1120) for generating channel feedback signaling based on the channel feedback information for transmission to the network side of the wireless communication network.

In a particular example embodiment, at least one channel is defined by a set, called resource unit, of at least two subcarriers.

Alternatively it is possible to realize the module(s) in FIG. 13 and FIG. 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (IO) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 12:
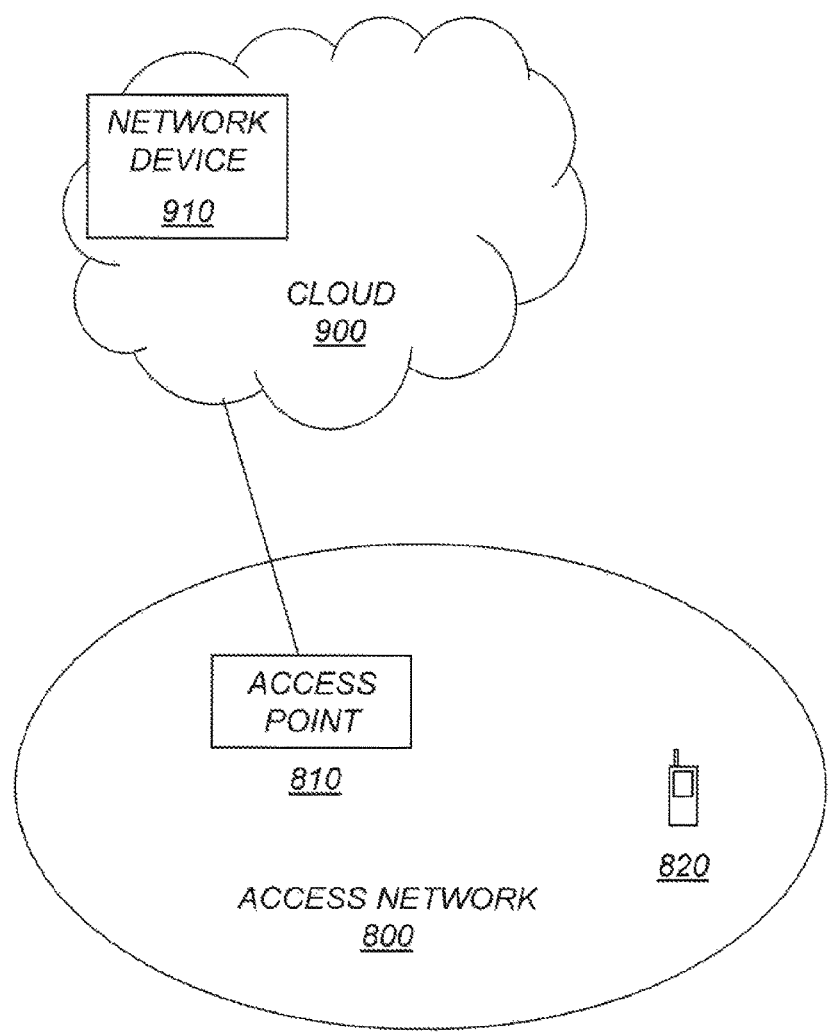
FIG. 12 is a schematic diagram illustrating an example of a cloud-based network device in connection with an access network.

FIG. 12 is a schematic diagram illustrating an example of a cloud-based network device 910 in connection with an access network 800. The network device 910 is located in a cloud environment 900. Functionality relevant for the access network 800 may be at least partially implemented for execution in a cloud-based network device 910, with suitable transfer of information between the cloud-based network device and the relevant network nodes such as an access point 810 and/or wireless communication devices 820 in the access network 800.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s).

Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] IEEE P802.11 Wireless LANs, "Specification Framework for TGax", doc.:IEEE 802.11-15/0132r15, January 2016.
[2] K. Seong et. al., "Optimal Resource Allocation for OFDMA Downlink Systems", Information Theory, 2006 IEEE International Symposium on, July 2006.
[3] R. Aggarwal et. al., "Optimal Resource Allocation in OFDMA Downlink Systems with Imperfect CSI", Signal Processing Advances in Wireless Communications (SPAWC), 2011 IEEE 12th International Workshop on, June 2011.
[4] IEEE P802.11 Wireless LANS, "11ax Evaluation Methodology", July 2014.

The invention claimed is:

1. A method for resource allocation for downlink transmission to at least two wireless communication devices in a wireless communication network, wherein simultaneous transmission to the wireless communication devices is allowed on one or more channels with at least two supported modulation alphabets of different sizes, each channel being defined by a set, called resource unit, of one or more subcarriers, wherein the method comprises:
   obtaining, for each of the wireless communication devices, channel feedback information for each modulation alphabet the wireless communication device supports and for each resource unit on which the wireless communication device is allowed to receive a transmission, such that, for each resource unit on which the wireless communication device is allowed to receive, channel feedback information for each of two or more modulation alphabets is obtained; and
   selecting, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices, wherein the step of selecting an assignment is based on maximization of the total downlink throughput for the wireless communication devices to find an optimal assignment of the wireless communication devices to at least one resource unit and at least one modulation alphabet, and wherein the maximization is defined as:

wherein index i ($1 <= i <= 1$) indicates user i where 1 is the total number of users;

wherein index j ($1 <= j <= J$) indicates resource unit j with J being the total number of resource units available;

wherein index k ($1 <= k <= K$) indicates number of wireless devices scheduled on a resource unit with K being the maximum allowed value;

wherein index l ($1 <= l <= J$) indicates the total number of resource units actually used for the downlink transmission;

wherein $x_{i,j,k,l}$ is a Boolean output variable, where $x_{i,j,k,l}=1$ indicates that wireless communication device i is allocated on resource unit j, with modulation k, along with k−1 other wireless communication devices, when a total of l resource units are used in the downlink; and wherein $y_{j,k,l}$ is a Boolean output variable, where $y_{j,k,l}=1$ indicates that resource unit j is used with modulation k, when a total of l channels are used in the downlink; and wherein $F_{i,j,k,l}$ is a function representing the rate that wireless communication device i will receive on resource unit j with modulation k when a total of l resource units are used in the downlink, wherein the maximization is subject to the following constraints:

for all combinations of j, k and l ($1 \leq j \leq J$, $1 \leq k \leq K$, $1 \leq l \leq J$)

$x_{i,j,k,l}, y_{i,j,k,l} \in \{0,1\}$, where $w_l$ is an auxiliary optimization variable.

2. The method of claim 1, wherein the channel feedback information, for each of the wireless communication devices, is representative of an effective Signal-to-Noise Ratio (SNR) for each supported modulation alphabet and for each resource unit assigned to the wireless communication device.

3. The method of claim 1, wherein the step of selecting an assignment includes selecting a total number of resource units, including selecting specific resource unit or units, to be used for the transmission, and also selecting which modulation alphabet(s) to be used for the transmission.

4. The method of claim 1, wherein the step of selecting an assignment includes one of the following:

selecting an assignment, when this assignment maximizes the downlink throughput, in which the information is to be transmitted on one resource unit using so-called multi-carrier modulation, with all the transmit power for the downlink transmission assigned to this resource unit;

selecting an assignment, when this assignment maximizes the downlink throughput, in which the information is to be transmitted on two or more resource units using so-called multi-carrier modulation, with the transmit power for the downlink transmission distributed between the resource units; and selecting an assignment, when this assignment maximizes the downlink throughput, in which each wireless communication device is assigned to its own resource unit, without using so-called multi-carrier modulation, with the transmit power for the downlink transmission distributed between the resource units.

5. The method of claim 1, wherein the step of obtaining, for each of the wireless communication devices, channel feedback information comprises the step of extracting the channel feedback information from feedback signaling received from the wireless communication device.

6. The method of claim 1, wherein the wireless communication network allows simultaneous downlink transmission to the wireless communication devices on one or more channels with at least two supported modulation alphabets of different sizes based on Orthogonal Frequency Division Multiple Access (OFDMA) and multi-carrier modulation.

7. The method of claim 1, wherein the wireless communication network is a wireless network adapted for Long Range Low Power (LRLP) communications.

8. The method of claim 1, wherein at least one channel is defined by a set, called resource unit, of at least two subcarriers.

9. The method of claim 1, wherein the method is performed by a network device.

10. An apparatus configured to perform resource allocation for downlink transmission to at least two wireless communication devices in a wireless communication network, wherein simultaneous transmission to the wireless communication devices is allowed on one or more channels with at least two supported modulation alphabets of different sizes, each channel being defined by a set, called resource unit, of one or more subcarriers, wherein the apparatus comprises:

processing circuitry; and a memory comprising instructions that, when executed by the processing circuitry, cause the processing circuitry to:

obtain, for each of the wireless communication devices, channel feedback information for each modulation alphabet the wireless communication device supports and for each resource unit on which the wireless communication device is allowed to receive a transmission, such that, for each resource unit on which the wireless communication device is allowed to receive, channel feedback information for each of two or more modulation alphabets is obtained; and select, from a number of possible assignments of the wireless communication devices to different resource units and different modulation alphabets, a resource allocation based on the channel feedback information including an assignment of the wireless communication devices to at least one resource unit and at least one modulation alphabet among those assignments providing the highest total downlink throughput for the wireless communication devices, wherein the memory comprises instructions that cause the processing circuitry to select an assignment based on maximization of the total downlink throughput for the wireless communication devices to find an optimal assignment of the wireless communication devices to at least one resource unit and at least one modulation alphabet, and wherein the memory comprises instructions that cause the processing circuitry to perform the maximization as follows:

wherein index i ($1<=i<=I$) indicates user i where I is the total number of users;

wherein index j ($1<=j<=J$) indicates resource unit j with J being the total number of resource units available;

wherein index k ($1<=k<=K$) indicates number of wireless devices scheduled on a resource unit with K being the maximum allowed value;

wherein index l ($1<=l<=J$) indicates the total number of resource units actually used for the downlink transmission;

wherein $x_{i,j,k,l}$ is a Boolean output value, where $x_{i,j,k,l}=1$ indicates that wireless communication device i is allocated on resource unit j, with modulation k, along with k−1 other wireless communication devices, when a total of l resource units are used in the downlink; and wherein $y_{j,k,l}$ is a Boolean output variable, where $y_{j,k,l}=1$ indicates that resource unit j is used with modulation k, when a total of l channels are used in the downlink; and wherein $F_{i,j,k,l}$ is a function representing the rate that wireless communication device i will receive on resource unit j with modulation k when a total of l resource units are used in the downlink;

wherein the apparatus is configured to perform the maximization subject to the following constraints:

$b_{j+1}$) w1+w2+ ... $w_J$=1;

c) $\Sigma_{i=1}^{N} x_{i,j,k,l} = k y_{j,k,l}$ for all combinations of j, k and l ($1 \leq j \leq J$, $1 \leq k \leq K$, $1 \leq l \leq J$), and where $x_{i,j,k,l}, y_{i,j,k,l} \in \{0,1\}$, where $w_1$ is an auxiliary optimization variable.

11. The apparatus of claim 10, wherein the memory comprises instructions that cause the processing circuitry to obtain channel feedback information, for each of the wireless communication devices, that is representative of an effective Signal-to-Noise Ratio (SNR) for each supported modulation alphabet and for each resource unit assigned to the wireless communication device.

12. The apparatus of claim 10, wherein the memory comprises instructions that cause the processing circuitry to select an assignment by selecting a total number of resource units, including selecting specific resource unit or units, to be used for the transmission, and also selecting which modulation alphabet(s) to be used for the transmission.

13. The apparatus of claim 10, wherein the memory comprises instructions that cause the processing circuitry to obtain, for each of the wireless communication devices, channel feedback information by extracting the channel feedback information from feedback signaling received from the wireless communication device.

14. The apparatus of claim 10, wherein the wireless communication network allows simultaneous downlink transmission to the wireless communication devices on one or more channels with at least two supported modulation alphabets of different sizes based on Orthogonal Frequency Division Multiple Access (OFDMA) and multi-carrier modulation.

15. The apparatus of claim 10, wherein the wireless communication network is a wireless network adapted for Long Range Low Power (LRLP) communications.

16. The apparatus of claim 10, wherein at least one channel is defined by a set, called resource unit, of at least two subcarriers.

17. The apparatus of claim 10, wherein the memory comprises instructions that cause the processing circuitry to perform resource allocation.

18. A network device comprising the apparatus of claim 10.

19. The network device of claim 18, wherein the network device is a network node or a cloud-based network device.

* * * * *